Figure 1:
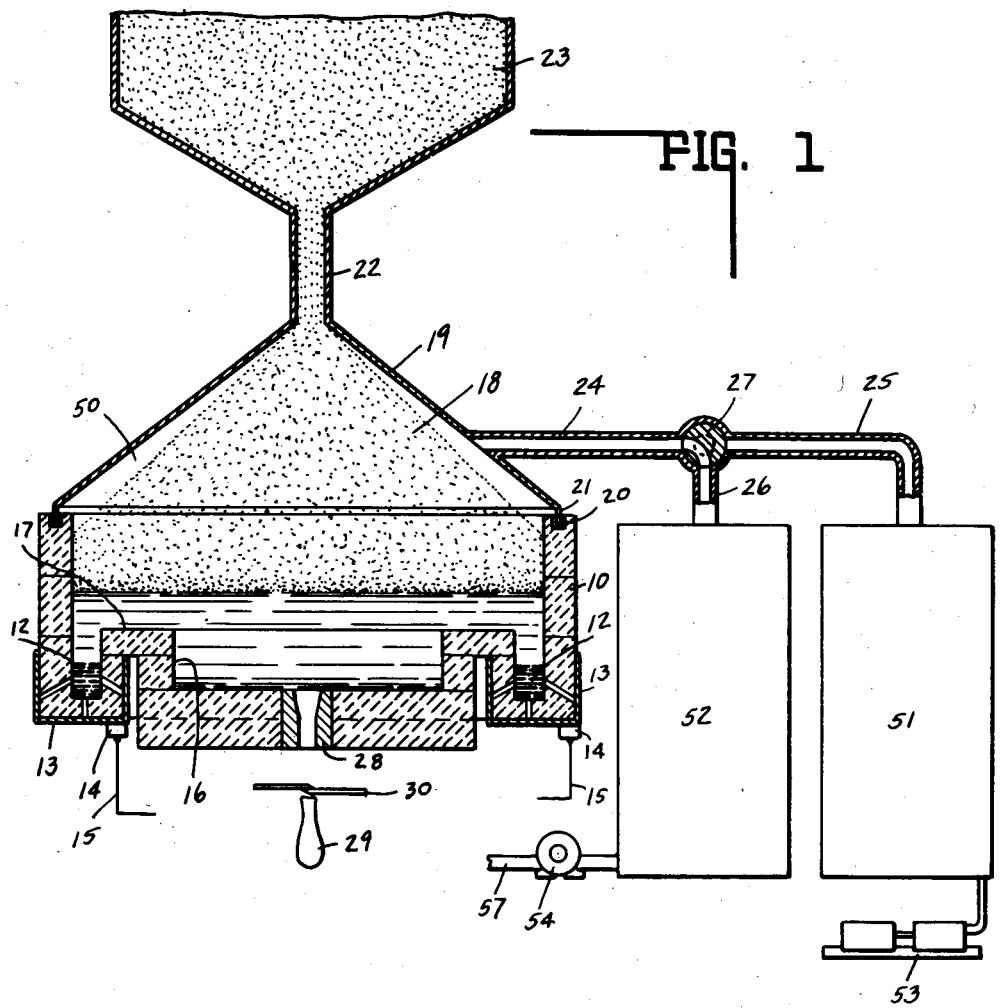

Oct. 29, 1935.  J. FERGUSON  2,018,884

ELECTRIC GLASS FURNACE

Filed Nov. 11, 1933  2 Sheets-Sheet 1

INVENTOR.
JOHN FERGUSON.

BY
Lockwood Lockwood Goldsmith & Galt
ATTORNEYS.

Oct. 29, 1935.  J. FERGUSON  2,018,884
ELECTRIC GLASS FURNACE
Filed Nov. 11, 1933   2 Sheets-Sheet 2
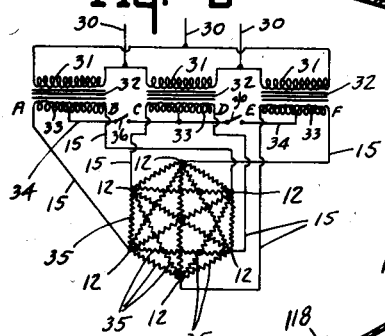
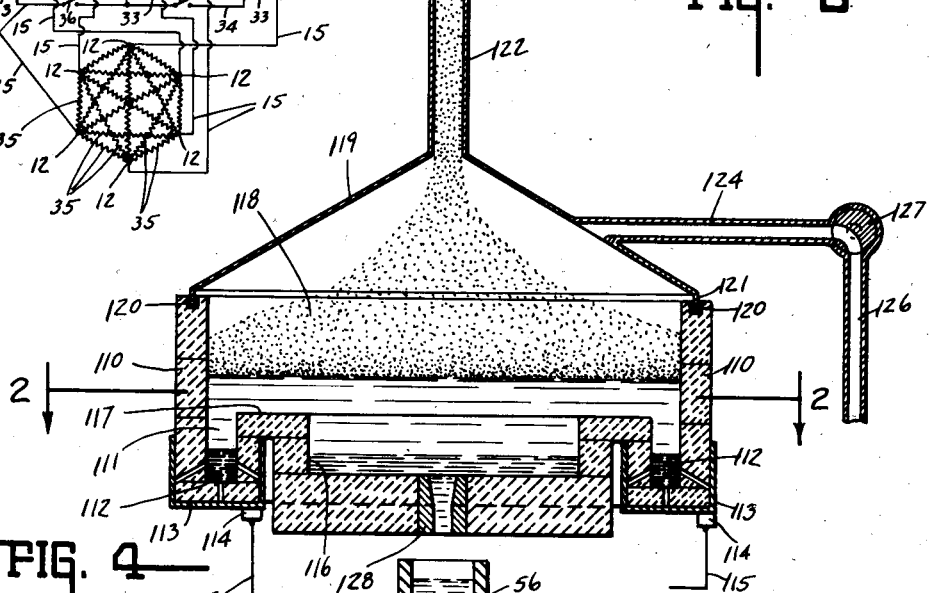
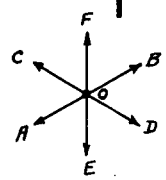
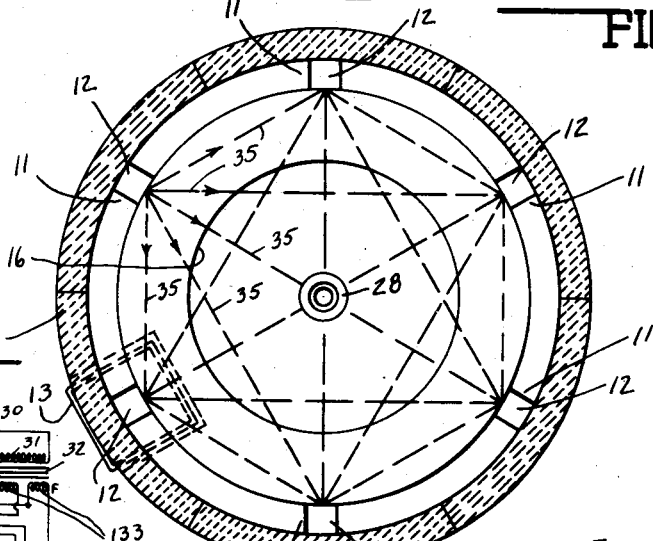
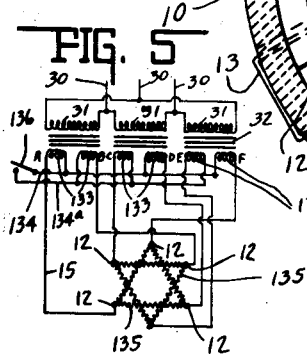
INVENTOR.
JOHN FERGUSON.
BY
Lockwood Lockwood Goldsmith & Galt
ATTORNEYS.

Patented Oct. 29, 1935

2,018,884

UNITED STATES PATENT OFFICE 2,018,884

ELECTRIC GLASS FURNACE

John Ferguson, Indianapolis, Ind., assignor to Fairmount Glass Works, Inc., Indianapolis, Ind., a corporation Application November 11, 1933, Serial No. 697,565

2 Claims. (Cl. 13—6)

This invention relates to an electric glass furnace for electrically melting glass to a molten state as required to manufacture glassware, reference being had to my co-pending application Serial No. 674,303, filed June 5, 1933, entitled Apparatus and process for heating glass furnace forehearth, which was issued as Patent No. 1,979,610 on Nov. 6, 1934.

Having in mind the advantages and possibilities inherent in an electrically heated furnace, as more specifically set forth and described in the above mentioned application, this invention particularly pertains to an electric furnace of a circular type wherein a plurality of electrodes may be positioned equi-distant about the periphery of the furnace in contact with the molten glass and connected with a multi-phase electric circuit for causing an equal distribution of current from one electrode to another. Such equal distribution of current between the several electrodes effects a network of paths through which the current passes which are well distributed throughout the body of the molten glass. Thus, equal heating of the body of molten glass is obtained and this increases the homogeneity of the product.

In addition to the above, a circular furnace of this type lends itself to a simple and effective means of feeding the glass therefrom to the molds in the same manner as the well known gob feeder or to a trough for continuous feeding. Furthermore, such gob feeding is possible without the use of a forehearth, the usual plunger and such mechanical means as are employed in connection therewith for feeding glass to the molds. This is accomplished in a relatively small furnace of this character by employing merely a discharge orifice in the bottom of the furnace and controlling the feed therethrough by variations in pressure applied to the interior of the furnace which is air sealed. Thus, gobs of glass may be discharged and controlled in size and shape substantially as in the usual plunger feed or the rate of continuous feed may be similarly controlled by maintaining a suitable pressure within the furnace.

In carrying out the invention a relatively small furnace, which is preferably circular in shape, is provided so that it may be sealed by a close-fitting conical dome. A multi-phase electric circuit is employed to heat the glass contained within the furnace through the medium of a plurality of electrodes spaced around its periphery while the batch may be fed through a suitable intake opening in the dome. This intake is sealed either by the entering batch material or by an air-tight gate and variations in pressure are effected within the interior of the dome and above the batch which floats upon the molten glass. Through the open orifice in the bottom of the tank glass may flow by gravity when atmospheric pressure or slightly less than atmospheric pressure is maintained, or may be forced through in gob formation upon alternate increases and decreases of pressure exerted within the dome. Such flow or discharge may be retarded in the manner effected by the plunger type feed by producing a partial vacuum within the tank. For continuous flow, the interior of the dome is maintained under less than atmospheric pressure, the weight of the molten glass and batch being sufficient to produce discharge. The surface of the molten glass is thus maintained at a sub-atmospheric pressure which permits small gas bubbles or "seed" to rise to the surface more rapidly and thus facilitates the elimination thereof.

Another advantage of this character of furnace resides in the ability to control the carbon dioxide gas given off by the batch so that it may be saved and utilized instead of being lost through the stack as in the usual furnace.

The full nature of the invention will be understood from the accompanying drawings and the following description and claims:

In the drawings, Fig. 1 is a schematic illustration showing a central vertical section through one form of the furnace and showing the pressure control apparatus applied thereto. Fig. 2 is a section taken on the line 2—2 of Fig. 6. Fig. 3 illustrates one form of the electric circuit employed in said furnace. Fig. 4 is a vector diagram showing the relation of voltages in the preferred form of multi-phase circuit. Fig. 5 is an alternative wiring diagram of electrical connections. Fig. 6 is a central vertical section of an alternative form of the furnace.

In the drawings, there is illustrated a circular glass melting furnace having annular side walls 10 within which there is a plurality of equi-spaced wells 11 in each of which there is an electrode 12. As shown herein there are six such electrodes, preferably formed of molten lead. Surrounding the wells 11 and extending to a point above the electrodes 12 there are steel jackets 13. Each of the steel jackets is electrically connected through a contact 14 with a lead wire 15 to the circuit, as illustrated in Fig. 3. The wells may have small conduits or fissures formed therein through which the molten lead may pass to make direct contact with the steel jacket 13.

Centrally of the furnace there is a well 16 for containing the refined glass above which the molten glass flows over an annular wall or bridge 17 into the well and direct contact with the electrodes 12. Thus, through the electric circuit current passes from one electrode to another above the upper surface of the annular bridge 17 and through the strata of molten glass contained thereabove for highly heating the same and maintaining it in a molten state at the desired temperature.

Supported or floated upon the molten glass there is a batch of material 18 which is to be melted and fed into the molten glass as the glass is used, so as to automatically maintain a given quantity of molten glass at a predetermined level within the furnace dependent upon the power transmitted through the circuit. The molten glass and batch are enclosed by a dome 19 having its lower peripheral edges supported upon the upper surface of the annular wall 10. An air seal is provided between the wall and the dome of the furnace which may be accomplished by embodying within the upper surface of the wall an annular metal trough 20 cemented therein by sodium silicate and containing mercury. The dome is provided with a downwardly extending peripheral flange 21 which extends into the trough so as to be surrounded by the mercury to effect the desired seal.

Connected with the top of the dome there is a batch supply chute 22. The chute is connected with an overhead batch reservoir 23 which is kept filled to a suitable depth to maintain the chute 22 completely filled and to maintain the conical pile of batch 18 above the molten glass. The batch material within the chute and reservoir effectively prevents ingress of air or egress of gases from the furnace. It will be seen from Fig. 1 that the slope of the dome 19 is slightly less than the angle of repose of the pile of batch so that a relatively restricted conical space 50 is left between the batch and the dome.

Connected with the dome at one side thereof there is a pressure controlled conduit 24 communicating with a pressure conduit 25 and a vacuum conduit 26 in conjunction with which there is provided a valve 27. Conduits 25 and 26 are connected to tanks 51 and 52 respectively, each having a volume preferably somewhat greater than that of the space 50. Tank 51 is kept filled with compressed air or carbon dioxide at a desired pressure by a compressor 53 and tank 52 is maintained at a suitable sub-atmospheric pressure by a centrifugal exhaust fan 54. By manipulation of the valve 27 to one position, tank 51 is operably connected with conduit 24, whereby greater than atmospheric pressure may be exerted through the conduit 24 to the interior of the dome for forcing refined glass from the bottom of the well 16 through a discharge orifice or feeder 28 extending downwardly therefrom. By manipulating the valve to the opposite position, the tank 52 is connected to the conduit 24 for withdrawing air and carbon dioxide from the dome and creating a partial vacuum therein for retarding the flow of refined glass through the discharge orifice or withdrawing it upwardly. Thus, by the manipulation of the valve 27 gob feeding of the molds may be effected in the same manner as is commonly practiced with the usual plunger type of feed, there being illustrated herein a gob 29 discharged from the orifice and severed by the shears 30. An important advantage of this arrangement is that no forehearth is required for the furnace, the glass being fed from the bottom thereof, and no plunger is required which causes trouble and breakage when used for feeding gobs to produce small glassware.

In this construction, the fact that the volume of gases within the furnace is restricted to the relatively small space 50 permits rapid changes in the pressure within the dome with a relatively small capacity of pressure and vacuum tanks.

In the case of a small furnace having a rapid rate of melting and a consequent rapid rate of evolution of carbon dioxide and other gases within the furnace it is not necessary to use the pressure tank 51 and compressor 53. Sufficient pressure for extruding a gob of glass may be generated by the gases evolved from the melting batch by simply closing the valve 27. For gob feed in such cases it is only necessary alternately to close valve 27 to build up a discharge pressure and to move the same to connect with the tank 52 for exhausting the gas to reduce the pressure.

Another advantage of the operation of this type of furnace lies in the fact that the gases given off in the furnace may be recovered as they are exhausted from the tank 52 by the fan 54. The carbon dioxide contained in the said gases is especially valuable. In order to prevent dilution of the gases to be recovered when the pressure tank 51 is in use, the compressor 53 may be arranged to intake from the tank 52 so that no extraneous air is introduced into the system.

In Fig. 6 there is shown a modified form of furnace which is particularly equipped for continuous feed instead of gob feed and in which an airtight gate is used to control the batch supply to the furnace. In this figure reference numbers in the one hundred series refer to parts having a similar construction and function to parts indicated by corresponding numbers in the unit series in Fig. 1. In this modification, the batch supply through conduit 122 is controlled by a suitable gate 55 which may be momentarily opened to admit the batch and when closed provides an air-tight seal. When operating under certain pressure conditions such a seal is necessary rather than the material seal illustrated in Fig. 1.

The furnace shown in Fig. 6 is arranged to discharge into a trough 56 for continuous feed rather than gob feed and for that reason apparatus for applying pressure to the interior of the furnace is not needed. The conduit 126 is connected to a vacuum producing device similar to that illustrated in Fig. 1 and the rate of discharge is controlled by varying the operation of the exhaust fan or by throttling the valve 127 to produce the proper subatmospheric pressure within the dome 119 for a desired rate of discharge.

A preferred form of circuit connected with the electrodes 12, as illustrated in Fig. 3, may be described as follows:

The power mains 30 of a three-phase alternating current supply are delta connected to the primary windings 31 of a bank of three similar transformers 32. The secondary windings 33 of said transformers have their midpoints connected by a common conductor 34 and their outer terminals each connected by one of the conductors 15 to one of the electrodes 12. Thus, the three-phase primary current is transformed into a six-phase, star-connected secondary system in which the phase relation and magnitudes of the voltages at the secondary terminals A, B, C, D, E, and F are as shown in the vector diagram, Fig. 4, the center O of which represents the common conductor 34 considered as at zero potential. It will be apparent that the voltage between the electrodes 12 connected to terminals A and C, for example, is the vector difference of vectors OA and OC and is proportional to the distance between the tips of said vectors. Similarly, the voltage between any two of the electrodes is proportional to the distance between the tips of their corresponding vectors.

The electrodes 12 are equally spaced about the periphery of the furnace and, therefore, the distance between any pair of electrodes is proportional to the distance between the corresponding vector tips and is proportional to the voltage between said electrodes. Since the resistance of the charge between two electrodes is proportional to the distance between them, it follows that a uniform current will pass from each electrode to each of the others. Thus, from each of the six electrodes there are five current paths 35 radiating to the other five electrodes and each path carries a current of the same magnitude as each of the others. By this means a symmetrical heating of the mass of molten glass is obtained which could not otherwise be obtained in a circular furnace.

Occasionally it is desirable to vary the distribution of the current in the mass of molten glass as when there is unequal radiation due to various causes. For this purpose there are provided switches 36 in the common connection 34. When these switches are opened, the star-connection of the secondary system is broken and only the three diametrical current paths between opposite electrodes are used. This results in a larger concentration of heat at the center of the furnace. Where necessary, the switches 36 may be periodically opened and closed.

In Fig. 5 there is shown an alternative wiring diagram in which provision is made for periodically reducing the concentration of heat at the center. In this diagram, transformers 32 are each provided with a pair of independent similar secondary windings 133 which are star-connected in groups of three by common conductors 134 and 134A. The connections of terminals A, B, C, D, E, and F of the secondary windings to electrodes 12 are the same as in Fig. 3. A switch 136 is arranged to connect conductors 134 and 134A. It is evident that, when switch 136 is closed, this winding is the equivalent of that of Fig. 3 with switches 36 closed, and that the same distribution of current will be provided. When switch 136 is opened, the secondary system is changed to two independent three-phase systems in which only the six current paths 135 connecting alternate electrodes are used as shown in Fig. 5. Thus, the concentration of current at the center of the furnace is reduced.

It will be evident to one skilled in the art that more or less than six electrodes may be provided, depending upon the size of furnace desired and may be connected to suitable transformer secondary systems of a greater or less number of phases to produce current distributions similar to those illustrated herein.

This type of furnace is particularly adaptable for use in the manufacture of small glassware, or for filling small orders requiring rapid turnover of the furnace capacity, or different colored glass. By variation of air pressure upon the glass itself within the air-tight dome of the furnace, the usual gob feeding may be obtained. However, where desired, continuous flow feeding may be employed and controlled by variations of tank pressure. Any suitable means may be employed for automatically controlling the valve 27 to obtain the desired results in feeding. As an example of vacuum control, a partial vacuum may be obtained in the furnace which may vary from one-half an inch of mercury to three inches. With a total depth of glass and batch of twelve to fifteen inches in the furnace, the vacuum required to stop the flow of glass from the orifice will be substantially three inches of mercury. Where it is desired merely to control the amount of a steady glass stream, a steady vacuum only will be required, adjusted to the proper value.

The partial vacuum may be obtained by the use of an ejector which would render available for conservation and use the carbon dioxide gas given off by the batch, which gas would be discharged through the conduits 24 and 26. The gas may also be recovered by connecting the discharge conduit 57 of the blower 54 to any suitable recovery apparatus. Thus, there may be obtained from the furnace approximately 200 pounds of carbon dioxide gas for every ton of batch melted, which is readily separable from the small amount of air entrained with the batch supply, whereupon the gas may be condensed in the usual manner for commercial use.

The invention claimed is:

1. An electric furnace for melting glass, including an annular reservoir, a plurality of wells formed about the periphery of the reservoir and spaced from each other, an electrode of molten metal in each of said wells, a centrally positioned annular well separated from said first mentioned wells by a circular bridge, said wells being adapted to contain molten glass having its level extending over said bridge, a discharge orifice communicating with the bottom of the annular well through which the molten glass contained therein may pass, a multi-phase circuit connected with said electrodes, means for generating current in said circuit, a dome supported over said reservoir to provide an air-tight closure therefor, means for feeding batch material through said dome onto the surface of the molten glass, and a conduit connected with said dome communicating with the interior thereof for varying the gas pressure therein to control the discharge of molten glass through said orifice.

2. An electric furnace for melting glass, including an annular reservoir having an annular trough formed in the upper surface of its wall, a plurality of wells formed about the periphery of the reservoir and spaced from each other, an electrode of molten metal in each of said wells, a centrally positioned annular well separated from said first mentioned wells by a circular bridge, said wells being adapted to contain molten glass having its level extending over said bridge, a discharge orifice communicating with the bottom of the annular well through which the molten glass contained therein may pass, a multi-phase circuit connected with said electrodes, means for generating current in said circuit, a sealed dome mounted over said furnace and having its annular lower edges extending in said trough, means for sealing the dome therein so as to render the interior of the furnace air-tight, means for feeding batch material through said dome onto the surface of the molten glass, and a conduit connected with said dome communicating with the interior thereof for varying the gas pressure therein to control the discharge of molten glass through said orifice.

JOHN FERGUSON.